United States Patent [19]

Cerutti-Maori et al.

[11] Patent Number: 5,721,614
[45] Date of Patent: Feb. 24, 1998

[54] OPTOELECTRONIC CAMERA WITH ANTI-REFLECTIVE COATING HAVING A CONTINUOUSLY VARIABLE THICKNESS AND METHOD OF MAKING SAME

[75] Inventors: Guy Cerutti-Maori, Cannes-La-Bocca; Jean-Philippe Chessel, Mandelieu, both of France

[73] Assignee: Aerospatiale Société Nationale Industrielle, Paris, France

[21] Appl. No.: 592,288

[22] PCT Filed: Jun. 26, 1995

[86] PCT No.: PCT/FR95/00847

§ 371 Date: Jun. 10, 1996

§ 102(e) Date: Jun. 10, 1996

[87] PCT Pub. No.: WO96/00886

PCT Pub. Date: Jan. 11, 1996

[30] Foreign Application Priority Data

Jun. 30, 1994 [FR] France .................. 94 08085

[51] Int. Cl.⁶ .......................... G01J 3/18; G02B 5/28
[52] U.S. Cl. .......................... 356/328; 359/589
[58] Field of Search .................. 356/328; 359/589

[56] References Cited

U.S. PATENT DOCUMENTS 3,442,572  5/1969  Illsley et al. .................. 359/589 X
4,954,972  9/1990  Sullivan ........................ 356/328 X
5,173,368  12/1992 Belmares ....................... 359/589 X

FOREIGN PATENT DOCUMENTS 0023149  1/1981  European Pat. Off.
203433   10/1983 Germany.
281664   8/1990  Germany.

*Primary Examiner*—Vincent P. McGraw
*Attorney, Agent, or Firm*—Fisher, Christen & Sabol

[57] ABSTRACT

A spectral imager or spectrophotometer-type optoelectronic camera including an optical system, a CCD-type set of photosensitive elements (3) at the focus of the optical system, a transparent protective window (5) arranged in front of the sensitive face (4) of the set of photosensitive elements (3), and a spectral disperser (1) allowing spectral analysis of the scene observed by the camera. The sensitive face (4) of the set of photosensitive elements (3) that points toward the protective window is coated with a monolayer or multilayer coating of anti-reflection material (9) whose thickness (e) varies continuously as a function of the wavelength of the light received by the sensitive face, parallel to the dispersion axis of the disperser (A).

9 Claims, 2 Drawing Sheets

OPTOELECTRONIC CAMERA WITH ANTIREFLECTIVE COATING HAVING A CONTINUOUSLY VARIABLE THICKNESS AND METHOD OF MAKING SAME

The present invention relates to an optoelectronic camera of the spectral imager or spectrophotometer type which minimizes phantom images, as well as to a set of photosensitive elements and a protective window for such a camera and to a method for producing such a set of photosensitive elements and such a protective window.

Optoelectronic cameras including an optical system, a CCD-type set of photosensitive elements which is arranged at the focus of said optical system and a transparent protective window arranged in front of said set of photosensitive elements are already known.

Such cameras are increasingly used and they have the advantage of delivering a digitized image.

In addition, such CCD cameras of the spectral imager or spectrophotometer type allow spectral analysis of the scene which they observe. In this case, they include a disperser (diffraction grating, prism, etc.), for example introduced into the optical system. Thus, the spectrum of the imaged scene is focused onto the set of photosensitive elements which are, for example, formed by a matrix or a linear array.

However, such optoelectronic cameras have the drawback of generating what is called in the art phantom images, which are added to the image of the scene. This results in a non-negligible error in the main image, which introduces errors into the analysis of this image, more particularly in the presence of objects with high luminance.

These phantom images are generated by the reflection of the polychromatic incident light from the sensitive face of the CCD set, from both of the faces of the protective window and from the last optical face of the optical system, which face points toward said protective window and toward said set of photosensitive elements.

These phantom images are spatially delocalized relative to the observed image and are recentered at other points on the set of photosensitive elements.

In order to try to eliminate these phantom images, consideration has already been given to depositing antireflection coatings on the faces which generate said phantom images, namely the photosensitive face of the set of said elements, both of the faces of the protective window and the last face of said optical system, which face points toward said protective window and said set of photosensitive elements.

Such antireflection coatings consist, for example, in a manner which is known, of products based on tungsten oxide or magnesium fluoride.

If the spectrum analyzed by the set of photosensitive elements is extended (for example between 400 and 1000 nm), it is not easy to produce wide-band anti-reflection coatings. Further, it is very difficult to obtain satisfactory antireflection multilayer coatings on the sensitive face of said set of photosensitive elements, in particular because this sensitive face consists of silicon.

The object of the present invention is to overcome these drawbacks, by profiting from the spatial spreading of the spectrum at the detector.

To this end, according to the invention, the optoelectronic camera including an optical system, a CCD-type set of photosensitive elements which is arranged at the focus of said optical system, a transparent protective window, for example made of glass, arranged in front of the sensitive face of said set of photosensitive elements and a spectral disperser allowing spectral analysis of the scene observed by said camera is note-worthy in that said sensitive face of said set of photosensitive elements, which face points toward said protective window, is coated with a monolayer or multilayer coating of antireflection material whose thickness varies continuously as a function of the wavelength of the light received by said sensitive face, parallel to the dispersion axis of said disperser.

It will be noted that the present invention is particularly advantageous. Indeed, since it is only known to optimize said monolayer at a single wavelength, up to 40% reflection may be reached away from the centering wavelength. In addition, as regards multilayer coatings, it is currently impossible to obtain both a low reflection factor and a wide spectral range, and it is this that the invention overcomes.

In contrast, according to the invention, since the thickness of the antireflection coating deposited on the sensitive face of said set of photosensitive elements is continuously variable, matching of the antireflection coating to the wavelength of the light arriving at each point on said sensitive face is obtained at said point, this matching being continuous over said face.

A reflection factor at most equal to 1% in a wide spectral range, for example of between 400 and 1050 nm, is thus obtained with such a monolayer or multilayer coating.

Preferably, in order to eliminate the phantom images further, at least one of the faces, and preferably both of the faces, of said protective window are also coated with a monolayer or multilayer coating of anti-reflection material whose thickness varies continuously as a function of the wavelength of the light received by said face, parallel to the dispersion axis of said disperser.

Preferably, the thickness of the coating deposited on the sensitive face of said set of photosensitive elements, as well as the thickness of the coating deposited on the faces of the protective window, are such that, at each point, the product of said thickness multiplied by the refractive index of the anti-reflection material is equal to an odd number of one quarter of the wavelength of the light arriving at this point.

In addition, the present invention also relates to a set of photosensitive elements allowing elimination of the phantom images in an optoelectronic camera of the spectral imager or spectrophotometer type, including an optical system, said CCD-type set of photosensitive elements which is arranged at the focus of said optical system, a transparent protective window arranged in front of said set of photosensitive elements and a spectral disperser allowing spectral analysis of the scene given by said camera. This set of photosensitive elements is noteworthy in that its face that is intended to point toward said protective window is coated with a monolayer or multilayer coating of antireflection material whose thickness varies as a function of the wavelength of the light received by said face, parallel to the dispersion axis of the disperser. The invention also relates to a protective window as defined, one of whose faces, and preferably both of whose faces, are coated with such a coating.

Thus, at every point on said sensitive face, the thickness of the anti-reflection coating is matched precisely to the wavelength of the light striking this point. The same may be true for both of the faces of the protective window.

Preferably, production of said monolayer or multilayer antireflection coating is obtained by evaporation/condensation or cathodic sputtering under vacuum of an antireflection material deposited onto said photosensitive face of said set of photosensitive elements, through a mask consisting of a rotary disc provided with a cutout in the shape of a sector with suitable profile, or a mask consisting of a plate which is provided with a trapezoidal cutout and to which a translational movement is imparted. This technique is also applicable to the coatings on the window.

Thus, during rotation or translation of the mask, the photosensitive surface of the set of photosensitive elements, in particular, is exposed in such a way that the exposure time increases progressively from the center of said mask toward its periphery.

The result of this is that the layer thickness of the antireflection coating increases continuously from the center of the mask toward its periphery.

The figures of the appended drawing will clearly explain how the invention may be embodied. In these figures, identical references denote similar elements.

Figure 3:
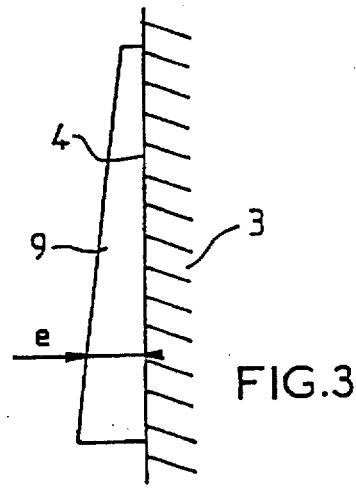

FIG. 3 schematically illustrates, in side view, the photosensitive element according to the present invention, provided with its antireflection coating on its sensitive face.

Figure 4:
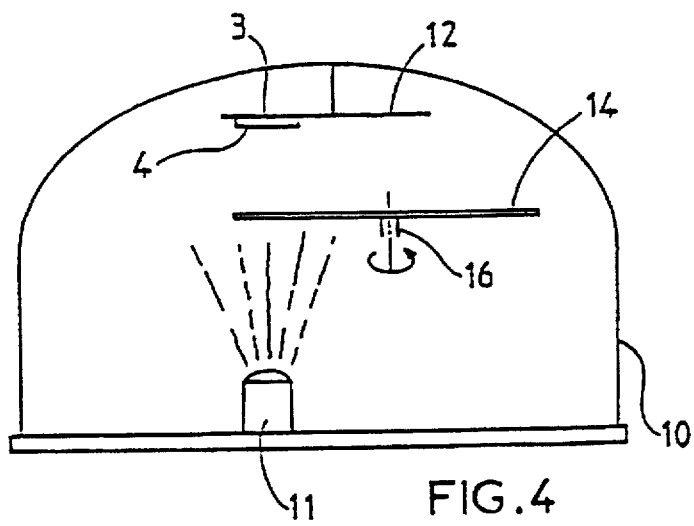

FIG. 4 schematically illustrates the method of forming said antireflection coating on the sensitive face of the element according to the present invention in the case of a rotating mask.

Figure 5:
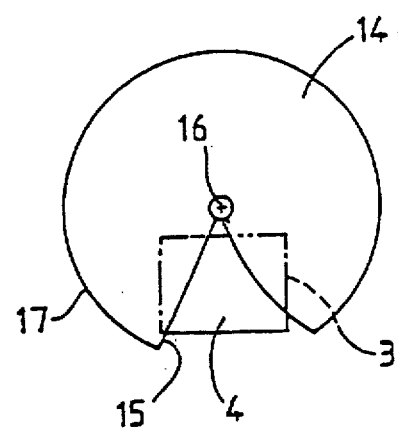

FIG. 5 more particularly shows a mask employed in the method illustrated by FIG. 4, as well as the relative arrangement of said set of photosensitive elements.

Figure 6:
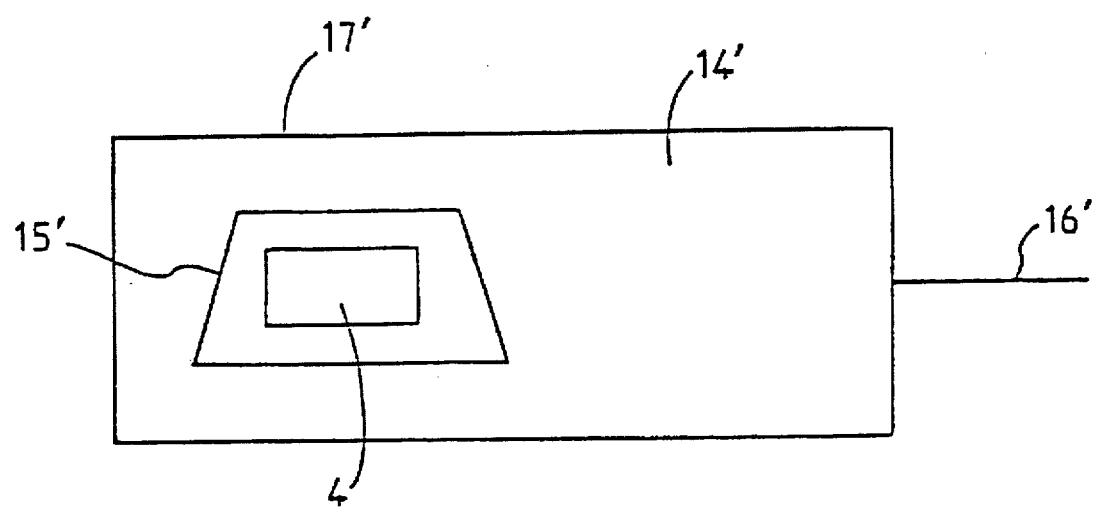

FIG. 6 shows another exemplary embodiment of a mask according to the invention.

Figure 1:
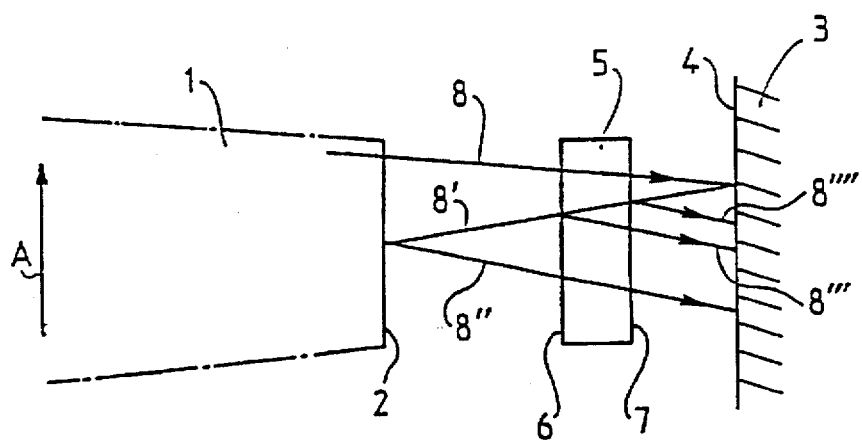
FIG. 1 is a schematic view illustrating the formation of the phantom images in a known optoelectronic camera of the spectral imager or spectrophotometer type.

FIG. 1 schematically and partially represents a known optoelectronic camera of spectral imager or spectrophotometer type.

This camera includes an optical system 1 provided with an end face 2 as well as a CCD matrix 3, provided with a sensitive face 4 that points toward said end face 2.

A protective window 5, consisting of a glass sheet with parallel faces 6 and 7, is arranged between the optical system 1 and the CCD matrix 3.

In addition, a disperser, represented only by its dispersion axis A, is incorporated into the optical system 1.

Thus, when a monochromatic incident beam 8, emerging from the optical system 1, reaches the sensitive face 4, the latter reflects a part of said beam and this reflected beam 8' is itself partially reflected toward the sensitive face 4 by the face 2 of the optical system 1 and by the faces 6 and 7 of the protective window 5. these various reflected beams are designated by 8", 8''' and 8''''.

Figure 2:
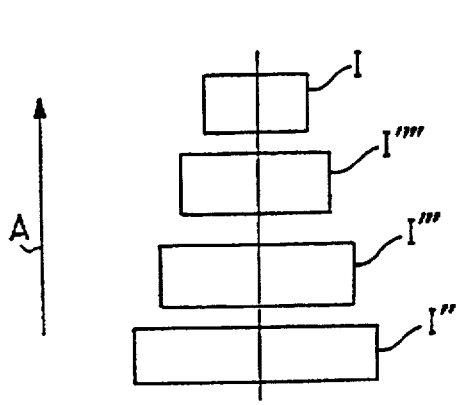
FIG. 2 illustrates the arrangement of the main image and of the phantom images on the photosensitive face of the known camera in FIG. 1.

This results, on the sensitive face 4 of the CCD matrix 3, in the phantom images I", I''' and I'''' in addition to the normal image I (see FIG. 2).

According to the invention, and as is schematically illustrated by FIG. 3, in order to eliminate the phantom images I", I''' and I'''', the sensitive surface 4, of the CCD matrix 3 is coated with a monolayer or multi-layer coating of antireflection material 9 whose thickness varies continuously as a function of the wavelength of the light received by said photosensitive face 4 and the refractive index of the material, parallel to the dispersion axis A of said disperser.

As indicated above, if the refractive index of the antireflection material is equal to n, at each point on the coating 9, the thickness e of the latter is such that the product n×e is equal to an odd multiple of one quarter of the wavelength of the light received at this point.

In order to obtain the coating 9 represented in FIG. 3, it is possible to employ the device schematically illustrated in FIGS. 4 and 5.

FIG. 4 represents a vacuum chamber 10 within which a crucible 11 containing the antireflection material to be deposited is arranged.

A support 12 on which the CCD matrix 3 is fixed in such a way that its sensitive face 4 points toward the crucible 11 is arranged at the upper part of the chamber 10.

In addition, a rotary disc 14 provided with a sector-shaped cutout 15 and a shaft 16, mounted so as to rotate by virtue of means which are not represented, is provided between the crucible 11 and the CCD matrix 3.

Thus, when the crucible 11 is heated, anti-reflection material is vaporized and projected toward the sensitive face 4 of the CCD matrix 3.

Since the CCD matrix 3 is arranged in such a way that it is masked by the mask 14 with the exception of that part of it which is in front of the cutout 15, the thickness of the projected anti-reflection material condensing at a point on the sensitive face 4 (which is a function of the exposure time of this photosensitive point, determined by the cutout 15), can have the desired value. This results in a thickness distribution that increases from the shaft 16 toward the periphery 17 of the mask 14, as illustrated in FIG. 3.

FIG. 6 shows another exemplary embodiment of a mask 14' provided with a trapezoidal cutout 15' made in a plate 17' to which a translational movement along the axis 16' can be imparted.

As mentioned above, in order to improve the elimination of the phantom images I", I''' and I'''' still further, it may be advantageous to coat at least one of the faces 6 and 7 of the window 5, and preferably both of the faces 6 and 7 of said window, with a monolayer or multilayer coating (not shown) of anti-reflection material whose thickness varies continuously as a function of the wavelength of the light received by said face, parallel to the dispersion axis (A) of said disperser. Such a coating can be obtained in the manner described above with reference to the coating 9 on the photosensitive elements 3.

We claim:

1. An optoelectronic camera of the spectral imager or spectrophotometer type, including an optical system (1), a CCD-type set of photosensitive elements (3) which is arranged at the focus of said optical system, a transparent protective window (5) arranged in front of the sensitive face (4) of said set of photosensitive elements (3) and a spectral disperser (1) allowing spectral analysis of the scene observed by said camera, wherein said sensitive face (4) of said set of photosensitive elements (3), which face points toward said protective window (5), is coated with a monolayer or multilayer coating (9) of antireflection material whose thickness (e) varies continuously as a function of the wavelength of the light received by said sensitive face, parallel to the dispersion axis of said disperser (A).

2. The optoelectronic camera as claimed in claim 1 wherein at least one of the faces (6,7) of said protective window (5) is also coated with a monolayer or multilayer coating of antireflection material whose thickness varies continuously as a function of the wavelength of the light received by said face, parallel to the dispersion axis of said disperser (A).

3. The optoelectronic camera as claimed in claim 2 wherein both of the faces (6,7) of said protective window (5) are also coated with such a monolayer or multilayer antireflection coating.

4. A set of photosensitive elements (3) which is intended for an optoelectronic camera of the spectral imager or spectrophotometer type, including an optical system (1), said CCD-type set of photosensitive elements (3) which is arranged at the focus of said optical system, a transparent protective window (5) arranged in front of said set of photosensitive elements and a spectral disperser (1) allowing spectral analysis of the scene given by said camera, wherein that face (4) of said set of photosensitive elements (3) which is intended to point toward said protective window (5) is coated with a monolayer or multilayer coating of antireflection material (9) whose thickness (e) varies as a function of the wavelength of the light received by said face, parallel to the dispersion axis of the disperser (A).

5. A transparent protective window (5) for an optoelectronic camera of the spectral imager or spectrophotometer type, including an optical system (1), a CCD-type set of photosensitive elements (3) which is arranged at the focus of said optical system, a spectral disperser (1) allowing spectral analysis of the scene given by said camera and said protective window (5) which is arranged in front of said set of photosensitive elements, wherein at least one of the faces (6,7) of said protective window (5) is coated with a monolayer or multilayer coating of antireflection material, whose thickness varies continuously as a function of the wavelength of the light received by said face, parallel to the dispersion axis of said disperser (A).

6. The window as claimed in claim 5 wherein both of the faces (6,7) of said protective window (5) are coated with such a monolayer or multilayer antireflection coating.

7. A method for producing the protective window as claimed in claim 5 wherein an antireflection material is vacuum-evaporated and wherein it is projected onto said photosensitive face (4) of said set of photosensitive elements (3) or the faces (6,7) of said protective window (5), through a mask.

8. The method as claimed in claim 7 wherein said mask consists of a rotary disc (14) provided with a cutout (15) in the shape of a sector.

9. The method as claimed in claim 7 wherein said mask consists of a plate (17') which is provided with a trapezoidal cutout (15') and to which a translational movement is imparted (16').

* * * * *